United States Patent Office 3,286,001
Patented Nov. 15, 1966

3,286,001
REACTION PRODUCTS OF ORGANOPHOSPHORUS MONOHALIDES WITH MERCAPTOALKYLAMINES
Bernard Buchner, Westfield, and George G. Curtis, Elizabeth, N.J., assignors, by mesne assignments, to Continental Oil Company, a corporation of Delaware
No Drawing. Filed June 7, 1963, Ser. No. 286,153
3 Claims. (Cl. 260—947)

This invention relates to novel organophosphorus aminoalkylsulfhydryl compounds and a novel process of making such compounds. It also relates to new uses and reactions of these compounds.

The new compounds are reaction products of di-substituted organophosphorus monohalides formed with a mercaptoalkylamine.

The di-substituted organophosphorus monohalide is illustrated by the following schematic structural formula:

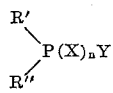

wherein "X" is a member of the class consisting of oxygen and sulfur, "n" is a digit selected from the group consisting of zero and one, "Y" is a member of the class consisting of chlorine and bromine and wherein R' and R" is a member of the class consisting of (a) (R), (b) (RO), (c) (RNH), (d) (RS), (e) ($R_2N$) and R'+R" is (f)

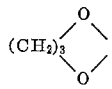

and wherein R is a member of the class consisting of an alkyl, aryl, alkaryl, aralkyl, alicyclic and heterocyclic radical.

The di-substituted organophosphorus monohalides are reacted with a mercaptoalkylamine. Examples of mercaptoalkylamines are:

(1) beta-mercaptoethylamine ($HS-CH_2-CH_2-NH_2$) (2-mercaptoethylamine),
(2) beta-mercaptopropylamine

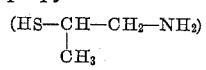

(2-mercapto-2-methylethylamine),
(3) 2-mercapto-, 1-methylethylamine

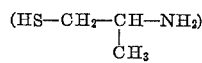

(4) mercaptobutylamine (4-mercaptobutylamine) ($HS-CH_2-CH_2-CH_2-CH_2-NH_2$), (1-mercapto, 4-aminobutane),
(5) 1-mercapto, 7-amonoheptane
  ($HS-CH_2-CH_2-CH_2-CH_2-$
  $CH_2-CH_2-CH_2-NH_2$)
  (mercaptoheptylamine).

The second and third mentioned mercaptoalkylamines are isomers and are frequently present in admixture in technical grades of beta-mercaptopropylamines. The beta-mercaptoalkylamines are preferred for this invention. The examples will illustrate the process and products with beta-mercaptoethylamine and beta-mercaptopropylamine.

The compounds falling under the six groups of R' and R" of the di-substituted organophosphorus monohalides are illustrated by the following list:

The following compounds illustrate Group (a):

Diethylphosphinous chloride ($(C_2H_5)_2PCl$)
Diethylphosphinic chloride ($(C_2H_5)_2P(O)Cl$)
Diethylphosphinothioic chloride ($(C_2H_5)_2P(S)Cl$)
Diethylphosphinous bromide
Dibutylphosphinous bromide
Dibutylphosphinous chloride The following compounds illustrate Group (b):

O,O'-dimethyl phosphorochloridothionate
O,O'-diethyl phosphorochloridothionate
O-methyl, O'-ethyl phosphorochloridothionate
O,O'-bis (2-chloroethyl) phosphorochloridothionate
O,O'-diphenyl phosphorobromidothionate
O,O'-dipropyl phosphorochloridothionate
O,O'-dibutyl phosphorochloridothionate
O,O'-n-diamyl phosphorochloridothionate
O,O'-i-diamyl phosphorochloridothionate
O,O'-n-dihexyl phosphorochloridothionate
O,O'-n-dioctyl phosphorochloridothionate
O,O'-diphenyl phosphorochloridothionate
O,O'-bis(2-methylphenyl) phosphorochloridothionate
O,O'-bis(3-methylphenyl) phosphorochloridothionate
O,O'-bis(4-chlorophenyl) phosphorochloridothionate
O,O'-bis(4-methylphenyl) phosphorochloridothionate
O,O'-diphenyl phosphorobromidothionate
O,O'-dimethyl phosphorochloridate
O,O'-diethyl phosphorochloridate
O,O'-i-dipropyl phosphorochloridate
O,O'-n-dibutyl phosphorochloridate
O,O'-dibenzyl phosphorochloridate
O-methyl, O'-(3,4-dichlorophenyl) phosphorochloridothionate
O-methyl, O'-ethyl phosphoropchloridothionate
O-methyl, O'-i-propyl phosphorochloridothionate
O-methyl, O'-i-amyl phosphorochloridothionate
O-i-butyl, O'-n-octyl phosphorochloridothionate
O-methyl, O'-(3,4-dichlorophenyl) phosphorochloridothionate
O,O'-bis(p-nitrophenyl) phosphorochloridothionate
O,O'-bis(p-dimethylaminophenyl) phosphorochloridothionate
O-cyclohexylphenyl, O'-methyl phosphorochloridothionate
O,O'-bis(2-chloroethyl) phosphorochloridothionate
O-ethyl, O'-phenyl phosphorochloridothionate
O-ethyl, O'-(4-nitrophenyl) phosphorochloridothionate
O-methyl, O'-(2,4,6-trichlorophenyl) phosphorochloridothionate
O-methyl, O'-(2,4,5-trichlorophenyl) phosphorochloridothionate
O-ethyl, O'-(2,4,5-trichlorophenyl) phosphorohchloridothionate
O-ethyl, O'-(2,4-dichlorophenyl) phosphorochloridothionate
O-methyl, O'-(2,-chloro-4-nitrophenyl) phosphorochloridothionate
O-methyl, O'-(2,5-dichlorophenyl) phosphorochloridothionate
O-methyl, O'-(4-chlorophenyl) phosphorochloridothionate
O-methyl, O'-(3-ethylphenyl) phosphorochloridothionate
O-methyl, O'-(2-phenylphenyl) phosphorochloridothionate
O-methyl, O'-(2-chloro-4-tertiarybutylphenyl) phosphorochloridothionate
O,O'-diethylphosphorochloridite ($(C_2H_5O)_2PCl$)
O,O'-i-dibutyl phosphorochloridate The following compounds illustrate Group (c):

N,N'-diethyl phosphorodiamidochloridate

N,N′-pentamethylene phosphorodiamidochloridothionate

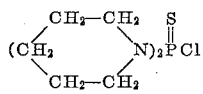

Group (d) is illustrated by:

S,S′-diethyl phosphorodithiolochloridothionate
(EtS)$_2$P(S)Cl

Group (e) is illustrated by:

N,N,N′,N′-tetraethylphosphorodiamidic chloride
[(C$_2$H$_5$)$_2$N]$_2$P(O)Cl

Group (f) is illustrated by:

O,O′-propylene phosphorochloridothionate

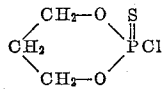

In one embodiment of this invention the resulting new compounds are di-(O-hydrocarbyl), N-(2-sulfhydroalkyl) phosphoramidothionates and are produced by reacting O,O′ - dihydrocarbyl phosphorochloroidothionates (di-substituted thiophosphoryl monochlorides) with a beta-mercaptoalkylamine.

The reaction is carried out in the presence of an inert solvent. Benzene, toluene, chloroform, tetrahydrofuran, ethylene chloride illustrate some of the suitable inert solvents. The boiling point of these solvents range from about 61° C. to about 111° C. However solvents with higher boiling points or somewhat lower boiling points are also suitable.

In addition to the inert solvent there is also present in the reaction mixture an acid acceptor. Suitable acid acceptors are, e.g.: triethylamine, pyridine, N-ethylmorpholine. A proper excess of the mercaptoalkylamine may also be used as an acid acceptor.

With regard to temperatures, as low limit a temperature is preferred where the mercaptoalkylamine used stays at least partially in solution in the solvent of the reaction mixture. In the case of beta-mercaptoethylamine, when using benzene or toluene as solvent, about 40° C. is the minimum temperature, as below this temperature the beta-mercaptoethylamine starts to come out of the solution. It is still possible to run the reaction somewhat below 40° C., however, the reaction requires more time for completion in such cases. Below 0° C. nearly all the beta-mercaptoethylamine is insoluble in benzene and toluene. Therefore temperatures below 10° C. are not considered suitable. The upper limit of reaction temperature is the boiling point of the solvent used. It is preferred not to exceed 150° C. The preferred temperature range is from about 40° C. to about 70° C.

Sulfhydryl groups have known reactivity toward phosphorus chlorides. Therefore our discovery, that beta-mercaptoethylamine and other beta-mercaptoalkylamines react with the herein described di-substituted organophosphorus monochlorides exclusively at the amine end, and leave the sulfhydryl end free, represents an unexpected result. Examples 5 and 6, below, illustrate this point. The compound of Example 1 and that of Example 6, prepared by two different routes, have been proven to be identical.

It should also be noted, that the sulfhydryl groups of the products of this invention are very stable, when compared to the sulfhydryl group of the mercaptoalkylamine, like that of beta-mercaptoethylamine. The latter cannot be stored without oxidation for longer periods, whereas the compounds herein described can be stored for long periods without noticeable change. This property is important, where the chemical properties of the free sulfhydryl groups are to be used. The use of the compounds as intioxidants, is an illustration of such an application.

The novel compounds of this invention can be used as intermediates in various reactions. This may be illustrated with the 2-sulfhydroalkyl phosphoramidothionates as follows:

(a) Acylation or esterification reaction:

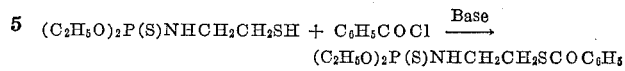

(b) Alkylation reaction:

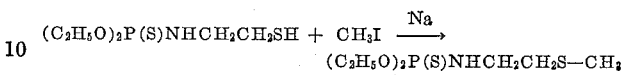

(c) Addition reaction:

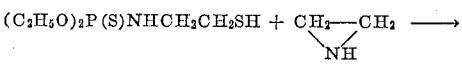

The following examples illustrate this invention, without limiting its scope:

*Example A.—Preparation of beta-mercaptoethylamine*

Four liters of ethanol were cooled to −70° C. to −80° C. and 850 grams (25.0 mols) of hydrogen sulfide gas was introduced into the cooled ethanol, while stirring. After the gas addition was completed the temperature was raised to −40° C. At this stage 258.0 grams of ethylenimine (6.0 mols), dissolved in one liter of ethanol, was added dropwise under agitation to the hydrogen sulfide solution in ethanol. After the addition was completed, the reaction mixture was stirred for two hours at −30° C. Then the temperature was slowly raised to room temperature, while the excess hydrogen sulfide escaped. Most of the ethanol was removed at 25–30° C. under vacuum. The precipitated beta-mercaptoethylamine was filtered, dried in a vacuum desiccator and stored until used.

*Example 1.—O,O′-diethyl, N-(2-sulfhydroethyl) phosphoramidothionate*

Reaction:

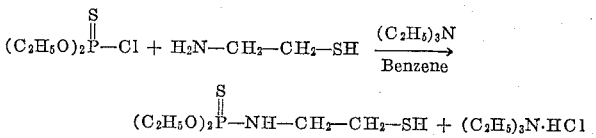

A warm solution of 60.0 grams (0.78 mol) of beta-mercaptoethylamine and 80.0 grams (0.78 mol) of triethylamine in 2.0 liters of benzene was added dropwise at 50° C. under continual stirring to a solution of 123.0 grams (0.65 mol) of O,O′-diethyl phosphorochloridothionate. After the addition, the reaction mixture was stirred for 1 hour at this temperature and then cooled to room temperature. The triethylamine hydrochloride which precipitated was filtered under suction. The solvent was removed under vacuum and the crude product distilled, in a molecular still. The physical properties were density ($d_4^{20}$) 1.159 and refractive index ($N_D^{20}$) 1.5166. The prewarmed beta-mercaptoethylamine solution had a temperature of about 40° C. to 60° C. when used.

*Example 2.—O,O′-diethyl, N-(2-sulfhydropropyl) phosphoramidothionate*

Fifty grams (0.4 mol) of beta-mercaptopropylamine hydrochloride dissolved in 40 ml. of water was treated with a solution of 16.0 grams (0.4 mol) of sodium hydroxide in 40 ml. of water resulting in a basic pH. This solution was extracted with 1.7 liters of chloroform, and the organic solution containing the beta-mercaptopropylamine was dried over anhydrous sodium sulfate, and filtered. To the chloroform solution were added 40.5 grams (0.4 mol) of triethylamine and one liter toluene. To the resulting solution, cooled to about 15° C., were added dropwise with agitation 56.6 grams (0.3 mol) of O,O′-diethyl phosphorochloridothionate dissolved in 500 ml. toluene. After the addition was completed, the reaction mixture was agitated for about one hour at room temperature and then heated to 65° C. for two hours. The mixture was concentrated to about 1000 ml. under vacuum and the precipitated triethylamine hydrochloride removed by filtration. The filtrate was washed with water, dried over anhydrous magnesium sulfate, filtered and the rest of the solvent removed under vacuum. The product, O,O'-diethyl, N-(2-sulfhydropropyl) phosphoroamidothionate

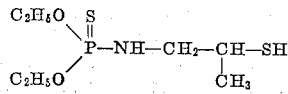

purified by low temperature, high vacuum distillation was recovered in a yield of 81.5%. The density ($d_4^{20}$) was 1.128 and, the refractive index ($N_D^{20}$), 1,5092.

The products of this invention, containing an N-(2-sulfhydroalkyl) open chain, can be utilized as intermediates in various reactions. In one such reaction they can be reacted with 2-haloalkylamine hydrohalides. Example 3 illustrates such a reaction, utilizing the product of Example 1 as starting material.

*Example 3.—O,O'-diethyl, N-(2-thioethylaminoethyl) phosphoroamidothionate*

Reaction:

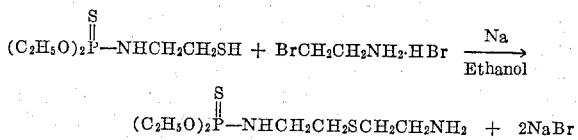

To a solution of 69.0 grams (0.3 mol) of O,O'-diethyl, N-(2-sulfhydroethyl) phosphoroamidothionate and 15.2 grams (0.66 mol) of sodium in 400 ml. of ethanol, was added 62.5 grams (0.31 mol) of 2-bromoethylamine hydrobromide under continual stirring. The mixture was heated to reflux for two hours under nitrogen, then cooled to room temperature. Sodium bromide was filtered under suction and the filtrate was concentrated under vacuum. The crude product was filtered, and distilled in an "ASCO" molecular still.

The product has a density ($d_4^{20}$), 1.157 and a refractive index ($N_D^{20}$), 1.5272.

Example 3 illustrates the formation of a thioether from the product of Example 1. Another process forming related thio compounds is illustrated by Example 4.

*Example 4.—O,O'-diisopropyl, S-(2-ethylamino) phosphorothiolothionate*

To a solution of 126.2 grams (0.5 mol) of potassium diisopropyl dithiophosphate and 12.6 grams (0.55 mol) of sodium in 880 ml. of ethanol, were added 106.2 grams (0.54 mol) of 2-bromoethylamine hydrobromide under continual stirring and the resulting reaction mixture processed as described in Example 3. The reaction product was purified by distillation at a temperature of 90° C. and a pressure of 45 microns Hg absolute. There was recovered as product (yield 82.5%) O,O'-diisopropyl, S-(2-ethylamino) phosphorothiolothionate, having the following structural formula:

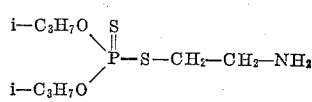

Certain physical properties of this compound were determined: Density ($d_4^{20}$) was 1.102 and the refractive index ($N_D^{20}$) was 1.5126.

The reaction described in Example 4 produces isomers of the type of compounds produced by Examples 1 and 2.

The structure of the product of Example 1 has been proven by reproducing it in a 2 step process as described below in Examples 5 and 6. Example 5 describes the preparation of an intermediate product.

*Example 5.—O,O'-diethyl, N-(S-benzylthioethyl) phosphoroamidothionate*

Reaction:

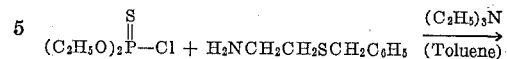
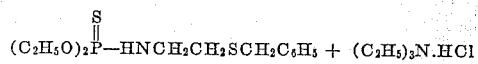

*Part I.*—To a solution of 85.3 grams (0.42 mol) of S-benzylthioethylamine hydrochloride in 400 ml. of distilled water, was added a solution of 17.6 grams (0.44 mol) of sodium hydroxide in 176 ml. of water. The free amine was extracted with chloroform, the extract dried over anhydrous sodium sulfate and filtered.

*Part II.*—To a solution of 66.0 grams (0.35 mol) of O,O'-diethylphosphorochloridothionate in 1 liter of toluene was added the solution of S-benzylthioethylamine (prepared in Part I, above) at 0° C. After the addition, the mixture was stirred at room temperature for one hour, then heated to 45° C. for an additional hour. The mixture was cooled to 0° C. and the triethylamine hydrochloride, which precipitated, was filtered. The filtrate was concentrated under vacuum to a volume of 400 ml. which was then washed twice with 200 ml. of water. The organic layer was dried over anhydrous magnesium sulfate, filtered, and the remaining solvent removed. The crude product was distilled in a molecular still. The physical properties were density ($d_4^{20}$) 1.151 and the refractive index ($N_D^{20}$) 1.5550.

*Example 6.—O,O'-diethyl, N-(2-sulfhydroethyl) phosphoramidothionate prepared by the debenzylation method*

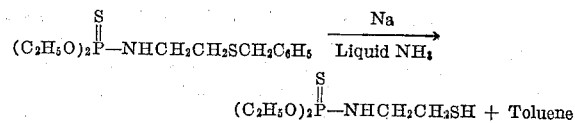

To a solution of 64.0 grams (0.2 mol) of O,O'-diethyl, N-(S-benzylthioethyl) phosphoramidothionate (Product of Example 5) in 500 ml. of anhydrous liquid ammonia, sodium was added in small pieces with stirring until a deep blue color persisted in the solution for at least two hours. The excess sodium was destroyed by adding a little ammonium chloride. Ammonia was then removed by heating the mixture gently. The residue was dispersed in 200 ml. of benzene and the suspension added to 300 ml. of a 3% hydrochloric acid solution at 5° C. The benzene layer was separated quickly, dried over anhydrous magnesium sulfate, filtered, and the solvent removed under vacuum. The crude was distilled in a molecular still. The physical properties were equal to that of the product of Example 1.

*Example 7*

This example illustrates an alternative reaction, where instead of beta-mercaptoethylamine its alkali metal salt is the reactant. Sodium salt or potassium salt may be used.

88.5 grams (1.15 mols) of beta-mercaptoethylamine was dissolved in 1500 ml. warm toluene. This solution under nitrogen and continual stirring was added to a slurry of 27.6 grams (1.2 mols) of sodium in 500 ml. hot toluene. After the addition was completed in increments, the reaction mixture was heated to reflux for about 3 hours. The end product at this point was a slurry of the alkali metal salt of beta-mercaptoethylamine. In a subsequent step 188.7 grams (1.0 mol) of O,O'-diethyl phosphorochloridothionate, dissolved in 500 ml. toluene was added dropwise to the above prepared salt slurry. After completion of the addition, the reaction mixture was heated under nitrogen to reflux for about 6 hours. The sodium chloride precipitate was filtered and the solvent was removed under vacuum at 35° C. The residue was dissolved in 400 ml. ethyl ether, treated with activated carbon and filtered under vacuum. After the solvent was removed, the crude residue was fractionated in an "ASCO" molecular still. The main product: O,O'-diethyl, N - (2-sulfhydroethyl) phosphoramidothionate, which is identical with the product of Example 1, was isolated in the lower boiling fractions. The byproduct: O,O',O'',O'''-tetraethyl, N, S-thioethylaminobisphosphorothionate

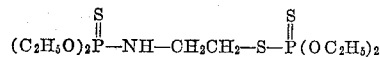

was obtained as the high boiling fraction. The proportion of the two products was about 8.5 parts main product for each 1 part of byproduct.

The products of this invention, particularly the ones having an N-(2-sulfhydroalkyl) open chain, are suitable as antioxidants in rubber, synthetic polymers, plastics, fatty oils, mineral oils, etc. and can be used as paint, varnish and resin additives to prevent aging by oxidation. They also act as stabilizers against heat and frequently against light. They act as stabilizers for polyvinyl-chloride and other polymeric plastics. Some of the compounds mentioned herein have herbicidal or insecticidal properties; others have effectiveness to reduce the action of radiation. Their use as intermediates in chemical reactions has been illustrated further above. Some other uses are listed here below.

PRELIMINARY SUMMARY OF TEST DATA

The product of Example 2, O,O'-diethyl, N-(2-sulfhydropropyl) phosphoramidothionate, has been tested in a herbicidal screening test. It did not show effective activity in pre-emergent tests. However its activity in post-emergent tests was distinct. The post-emergent tests were made on flats, containing as dicots: bush bean, radish, tomato, pigweed, crimson clover and as monocots: oats, crab grass, rye grass. The flats were preseeded on varying dates to provide adequate pre-emergence on the testing day. The product of Example 2 was dissolved in acetone at 10% strength, as a master solution. After proper dilution, it was applied at about 19 lbs. per acre dosage. Application was by spray. The plants were observed 1 day, 8 days and 14 days after application of the herbicide candidate. Activity was shown in decreasing order, amongst the dicots: pigweed, crimson clover, radish, and last, at about equal degree: bush beans and tomato. Amongst the monocots, greatest activity was shown with crab grass, more moderate activity with rye grass and low activity with oats. The results show some selectivity both with the dicots and with the monocots.

The product of Example 3, O,O'-diethyl, N-(2-thioethylaminoethyl) phosphoroamidothionate, was tested in a similar manner for herbicidal activity, as described with the product of Example 2. Also this product showed no effective activity in pre-emergent tests. In post-emergent testing its activity was distinct. On dicots the order of effectiveness was as follows: pigweed, crimson clover, radish, bush bean, tomato, the last one being least affected. On monocots in decreasing order of activity the results were: crab grass, rye grass, oats. On pigweed the product of Example 3 was somewhat more active, than that of Example 2. With the others their activity was close, in about the same range.

The product of Example 4, O,O'-diisopropyl, S-(2-ethylamino) phosphorothiolothionate, was also tested in the same series for herbicidal activity as described with Examples 2 and 3. The product of Example 4 also did not show effective activity in pre-emergent tests. Its activity in post-emergent tests was distinct. On dicots it was more active than the products of Examples 2 and 3. The order of activity in decreasing sequence was: radish, crimson clover, pigweed, bush bean and tomato. The activity was somewhat selective, particularly towards tomato, where the effect was in the low range. On monocots, the range on all three was about the same, showing no selectivity and equal activity towards oats, crab grass and rye grass.

The product of Example 4 was also tested in a different set of screening for more diversified activity. Phytotoxicity was tested by seed germination. Candidate chemicals, at dosages indicated, are pipetted in 5 cc. quantities onto filter paper contained within plastic Petri dishes. Seeds of selected crops are then placed on the treated discs and observed for germination over a period of time. The number of seeds germinating and general observations on extent of root and octyledon damage is an index of herbicidal potential of the chemical compound. Data and percent seed germination and any unusual growth behaviors are noted on the seventh day. A phytotoxicity rating is then given to the chemical compound in a manner, that "0" indicates no injury and "10" indicates plants killed. The following phytotoxicity ratings were found with the product of Example 4: Barley 7, radish 9+, flax 10, tomato 9+. With flax the percent emergence was zero. The dosage was 2500 p.p.m. Biocidal properties were tested with the soil-inoculum-broth culture technique. In this test a turbidity index indicates the growth classes. After two days at 5000 p.p.m. no turbidity was observed, at 500 p.p.m. the turbidity rating was 2, indicating slight growth. The results show distinct biocidal activity for this compound. For nematocidal activity a test tube contact screen test was made with Panagrellus species. At 500 p.p.m. the product of Example 4 showed 85% mortality after 1 day, 99% mortality after 2 days and 100% mortality after 3 days, indicating distinct nematocidal activity. Insecticidal activity was tested on confused flour beetle, Drosophila flies and Mexican bean beetle. The effect on confused flour beetle was tested with the contact residual film test. The chemical is prepared in acetone solution or as wettable powder. It is deposited as 1 ml. of chemical dosage to be tested, uniformly over a 9.6 cm. diameter Petri plate. The chemical is permitted then to dry to a thin film-like layer. Adult Confused Flour Beetles (*Tribolium confusum*), priorly starved for 24 hours, are then placed, 10 per plate, on duplicate test vessels. The Petri plates are closed during the observation. At 2500 p.p.m. concentration the product of Example 4 showed 85% kill in 2 days and 100% kill in 5 days observation. The control showed zero kill. The action on Drosophila melanogaster was also tested by contact exposure to film. The test chemical is deposited within test tubes (25 mm. x 200 mm.) in a volatile solvent. The test tubes are mechanically rotated to obtain a thin film uniformly distributed on the inside walls. The flies are released into each tube and the test tubes are stoppered with an absorbent cotton plug holding a protruding tip (Dental Gum) impregnated with sufficient liquid food to carry them for three days. At 1000 p.p.m. concentration 100% of the flies were killed in 24 hours. In the control zero percent was killed, i.e. all flies survived. Observations were made earlier also, and it was noticed, that the rate of activity was extremely rapid. The 24 hours results are standard for this test. Actually about 80% of the flies were knocked down and dead within the first hour. Mexican Bean Beetle test is made with a leaf and larvae dip test. The beetles are carried in routine culture on red kidney bean. Third instar larvae are removed from the culture and are transferred to excised bean leaves contained in Petri plates just prior to the dipping operation. After the larvae attached themselves to the leaves in normal manner, the leaf with the larvae is momentarily dipped into the test solution. Leaf and larvae are returned then to the normal test vessels and held for observation. In most cases they are kept under closed conditions. Application was from Wettable Powder Concentrate suspension at 1000 p.p.m. dosage. After 48 hours 50% larvae were killed and the extent of leaf feeding, after treatment was 55%. After 72 hours 83% of the larvae were killed and extent of leaf feeding, after treatment was 60%. Control showed for both time intervals zero kill and 100% feeding. The general rating is: effective, degree of effectiveness: moderate.

The product of Example 5, O,O-diethyl, N-(S-benzylthioethyl) phosphoroamidothionate, was tested in a similar manner as described in the second portion of the tests with the product of Example 4. In insecticidal screening it was very active against confused flour beetle at 2500 p.p.m. concentration. Approximately 90% of the insects were killed in 8 hours. In the usual observation period of two days, the kill was 100%. The control showed zero kill. Against Drosophila the activity was in the moderate range at 1000 p.p.m. test concentration. In 24 hours the kill was 63% and in 48 hours 77%. In the Leaf and Larvae dip method with Mexican bean beetles a unique effect was obtained. Whereas in 48 hours the kill of the larvae was only 50%, extent of leaf feeding, after treatment was reduced to 10%. After 72 hours the kill of the larvae was at 50% level and the feeding was at 12%. The results show, that this product repells or inhibits the feeding of the larvae. According to the observers actually the feeding that took place occurred prior to dipping as there is generally a period of 5 to 10 minutes in which the larvae are adjusting themselves on the leaf surface prior to dipping. The degree of feeding is observed on the leaf at the end of the test by comparison to the control. In the phytotoxicity test this compound showed low to moderate activity, with full inactivity against radish. The biocidal screen showed some activity, but rather on the low side. However, the product showed distinct, moderate fungicidal activity in a fungicide screen. This test is called Oat Seed Disinfection Evaluation. Oat seed known to be heavily infected with *Helminthosporium avenae* is treated with candidate compound at various dosages for a period of 15 minutes by immersion. At the end of the period the solution is drained off and the seed then plated out on Petri dishes containing moistened filter paper. Lack of control is evident by the dark colored organism sporulating in profusion on the seed surface and on the adjoining filter paper. Data are taken to show percent disease control. The results obtained were as follows:

| Product of— | Dose, p.p.m. | Percent Germination | Percent Disease Control |
|---|---|---|---|
| Example 5 | 5,000 | 18 | 86 |
| Do | 500 | 26 | 76 |
| Do | 50 | 30 | 72 |
| Control | | 38 | 26 |

Based on these results, the product of Example 5 is moderately fungicidal. Additives, varying dispersion methods and considering other species, a distinct fungicidal activity can be expected, as these variations could greatly increase activity.

In the reaction illustrated by Examples 1 and 2 the beta-mercaptoalkylamine should be at least in equimolecular proportions to the di-substituted oganophosphorus monochloride. A slight excess of the beta-mercaptoalkylamine is preferred. The order of addition illustrated in Examples 1 and 2 may be changed. As inert solvents benzene, toluene and other aromatic hydrocarbons are preferred.

We claim:
1. A di-(O-hydrocarbyl), N-(2-sulfhydroalkyl) phosphoramidothionate.
2. O,O'-diethyl, N-(2-sulfhydroethyl) phosphoramidothionate.
3. O,O'-diethyl, N-(2-sulfhydropropyl) phosphoramidothionate.

References Cited by the Examiner
UNITED STATES PATENTS

| | | | |
|---|---|---|---|
| 2,852,550 | 9/1958 | Godfrey | 260—461.106 |
| 3,035,080 | 5/1962 | Arnold et al. | 260—461.106 |
| 3,074,992 | 1/1963 | Arnold et al. | 260—461.106 |

OTHER REFERENCES

Mastryukova: "Chem. Abst.," vol. 51, column 18441(f) (1957).

CHARLES B. PARKER, *Primary Examiner.*

F. M. SIKORA, *Assistant Examiner.*